(12) United States Patent
Coshow

(10) Patent No.: US 11,560,278 B2
(45) Date of Patent: Jan. 24, 2023

(54) LOADING DOCK SIGNAL LIGHT CHANGE INDICATOR

(71) Applicant: Al Coshow, Albany, OR (US)

(72) Inventor: Al Coshow, Albany, OR (US)

(73) Assignee: Light Spike Ind. LLC, Albany, OR (US)

( * ) Notice: Subject to any disclaimer, the term of this patent is extended or adjusted under 35 U.S.C. 154(b) by 166 days.

(21) Appl. No.: 16/931,260

(22) Filed: Jul. 16, 2020

(65) Prior Publication Data

US 2021/0002090 A1 Jan. 7, 2021

Related U.S. Application Data

(60) Provisional application No. 62/869,631, filed on Jul. 2, 2019.

(51) Int. Cl.
*B65G 69/00* (2006.01)

(52) U.S. Cl.
CPC ......... *B65G 69/003* (2013.01); *B65G 69/006* (2013.01)

(58) Field of Classification Search
None
See application file for complete search history.

(56) References Cited

U.S. PATENT DOCUMENTS

| 4,692,755 A | 9/1987 | Hahn |
| 4,843,373 A | 6/1989 | Trickle et al. |
| 8,421,611 B1 | 4/2013 | Coshow et al. |
| 2015/0172518 A1* | 6/2015 | Lucas ................ H04N 5/23203 348/148 |
| 2019/0302764 A1* | 10/2019 | Smith ................ B65G 69/2882 |
| 2020/0024090 A1* | 1/2020 | Mushynski ............ G08G 1/005 |

* cited by examiner

*Primary Examiner* — Adolf Dsouza
(74) *Attorney, Agent, or Firm* — Chernoff, Vilhauer, McClung & Stenzel, LLP

(57) ABSTRACT

Loading dock signal light change indicator apparatuses including a including light sensors that detect a change from illumination of a red signal light to illumination of a green signal light from a loading dock signal light assembly, and that generate one or more detection signals in response to that detected change. The apparatuses may additionally include one or more transmitters that transmit one or more wireless signals in response to the one or more light sensor signals, and a receiver that receives the one or more wireless signals from the transmitter(s). The apparatuses may further include devices that generate one or more audio, tactile, or visual outputs in response to the receiver receiving the one or more wireless signals, and are separate and distinct from the loading dock signal light assembly.

13 Claims, 3 Drawing Sheets

LOADING DOCK SIGNAL LIGHT CHANGE INDICATOR

CROSS-REFERENCE TO RELATED APPLICATIONS

This application claims the benefit of U.S. Provisional Patent Application Ser. No. 62/869,631 filed on Jul. 2, 2019 and entitled "Green Light Alert Docking Indicator System." The complete disclosure of the above application is hereby incorporated by reference for all purposes.

TECHNICAL FIELD

The present disclosure relates to loading dock signal light change indicators, and more specifically to a indicator that lets the driver know of a signal light change in a red light/green signal light system mounted in a common housing mounted on the outer surface of the dock structure adjacent a dock door to advise a truck driver when it is safe to back up to a dock or depart from a dock.

BACKGROUND

Many systems have been utilized over the years to prevent the unauthorized movement of a truck toward and away from a loading dock to prevent injury to employees involved in the loading and unloading of the truck. Many of these systems have relied upon complicated, physical restraint structures which actually grip a portion of the truck or block the wheels of a truck to prevent the truck from unauthorized movement away from the loading dock. Such systems are extremely complicated and expensive to build and install and frequently can cause expensive damage to a truck.

Systems have heretofore been provided for controlling operations and indicating operations at truck docking facilities. U.S. Pat. No. 4,692,755 (Hahn) discloses a system in which signal lights are provided on the inside and outside of a dock facility to give dock personnel and truck drivers clearly visible indications of when it is safe or unsafe to load or unload a truck or to park or remove a truck, and to provide other safety features. An improvement of the system of the Hahn Patent is disclosed U.S. Pat. No. 4,843,373 (Trickle). The complete disclosures of the above Hahn and Trickle Patents are hereby incorporated by reference for all purposes. The system of the Trickle Patent includes a programmable control unit which is versatile and provides various safe and reliable modes of operation, being also operable to perform diagnostic operations. These systems have produced increased safety and efficiency in loading and unloading operations with the result that problems and the possibilities for other improvements have not been recognized.

Distribution of goods takes place on a large scale. Trucks are often used here, wherein the goods for distribution are loaded into the truck, transported and then unloaded at a desired location. Loading usually takes place at a location where the goods are stored, produced and/or assembled, and unloading usually takes place where the goods are further distributed, processed and/or sold. During loading and unloading of the goods use is generally made here of a loading and/or unloading station for trucks, also referred to as dock, which form part of a distribution center. Because a truck can be positioned relatively closely to the dock, both goods and people can be protected relatively well from (unfavorable) weather conditions. Increases in scale make it increasingly profitable to use one or more docks for loading and unloading goods.

In the course of time there has been further innovation in the docks to enable improvement of the loading process and unloading process. Examples of such innovations are automated displacement of a loading floor (dock leveler), automated control of a door construction, detection of the presence and the position of a truck relative to the dock, and application of diverse signaling lights. However, the control and monitoring of the docks by means of local installation of required software generally results in problems as a result of outdated software and installation of required updates. This method of monitoring and control moreover results in limitations in daily use. A further risk is that, if a (part of a) dock malfunctions, this is not always noticed by the relevant dock operator, which may result in dangerous situations.

A further complication is that quite often a driver must sit and wait in his or her truck for loading to be completed. Many hours can pass before loading operations are finished requiring the driver to be on increased vigilance for increased amounts of time. If the driver were to miss the visual signaling of dock control lights, efficiency of the distribution center may be diminished. The present disclosure seeks to remedy this problem by providing a visual and audio system to alert drivers when loading is complete that does not require driver vigilance to receive the notification.

SUMMARY

The present disclosure provides a truck loading and unloading status notification system, which includes an audible and visual in-vehicle alert system. The truck loading and unloading status notification system reads a dock signal light system, such as a traditional red/green signal light system, then provides an in-cab notification when the signal light changes. The change in the dock signal light typically indicates loading (or unloading) is complete and the truck may depart the distribution or loading/unloading center.

A further understanding of the present disclosure can be obtained by reference to a preferred embodiment set forth in the accompanying Description. Although the illustrated embodiments are merely exemplary of apparatus or methods for carrying out the present disclosure, both the organization and method of operation, in general, together with further objectives and advantages thereof, may be more easily understood by reference to the illustrations and the following Description. The Drawings are not intended to limit the scope of the disclosure, but merely to clarify and exemplify the disclosure.

DETAILED DESCRIPTION

Various embodiments of the loading dock signal light change indicator apparatuses and methods according to the present disclosure are described below and illustrated in the associated drawings and appendices. Unless otherwise specified, loading dock signal light change indicator apparatuses and methods may contain at least one of the structure, components, functionality, and/or variations described, illustrated, and/or incorporated herein. Furthermore, the structures, components, functionalities, and/or variations described, illustrated, and/or incorporated herein in connection with the present teachings may be included in other loading dock signal light change indicator apparatuses and methods. The following description of various embodiments is merely illustrative in nature and is in no way intended to limit the disclosure, its application, or uses. Additionally, the advantages provided by the embodiments, as described below, are illustrative in nature and not all embodiments provide the same advantages or the same degree of advantages.

Figure 1:
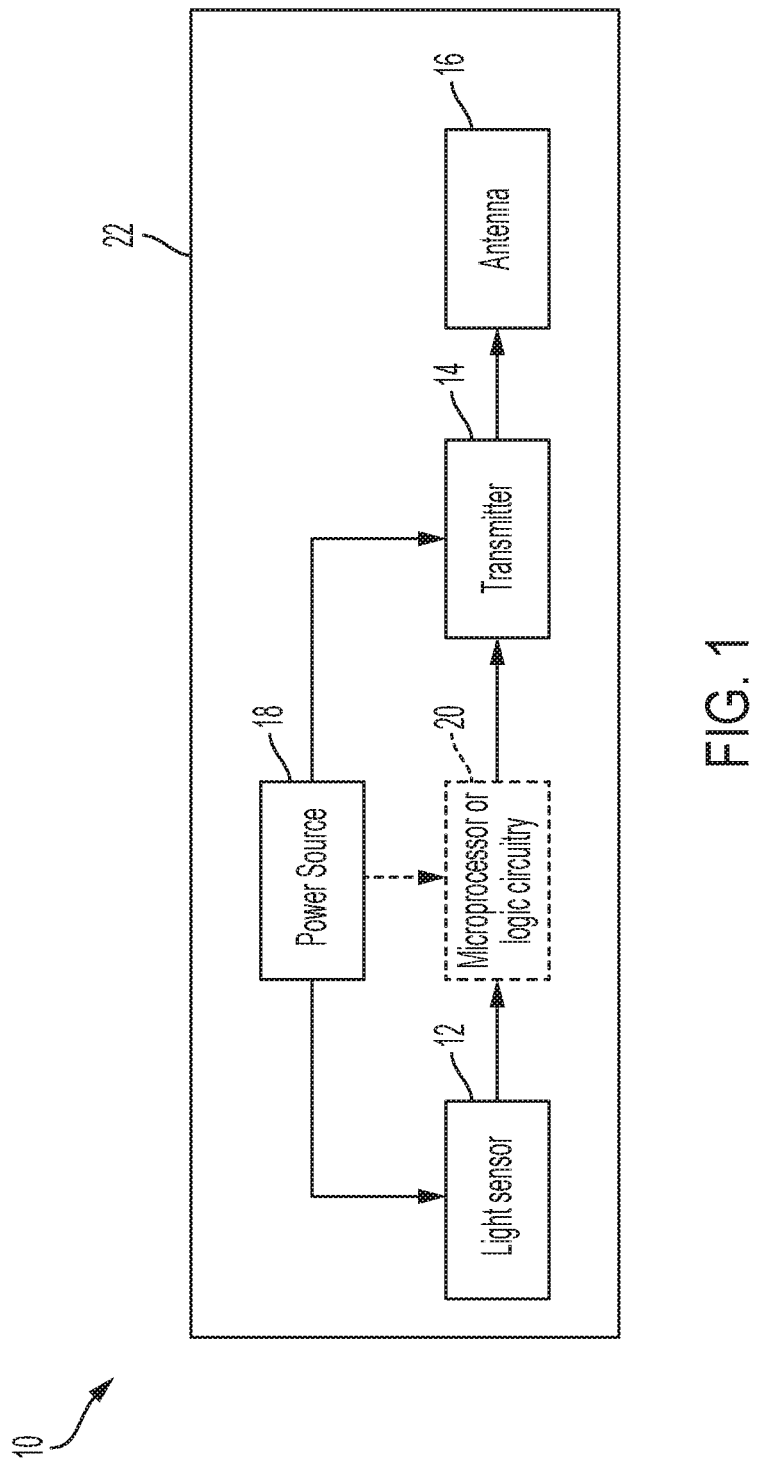
FIG. 1 is a block diagram showing components of a transmitting portion or device according to an embodiment of the present disclosure.
Figure 2:
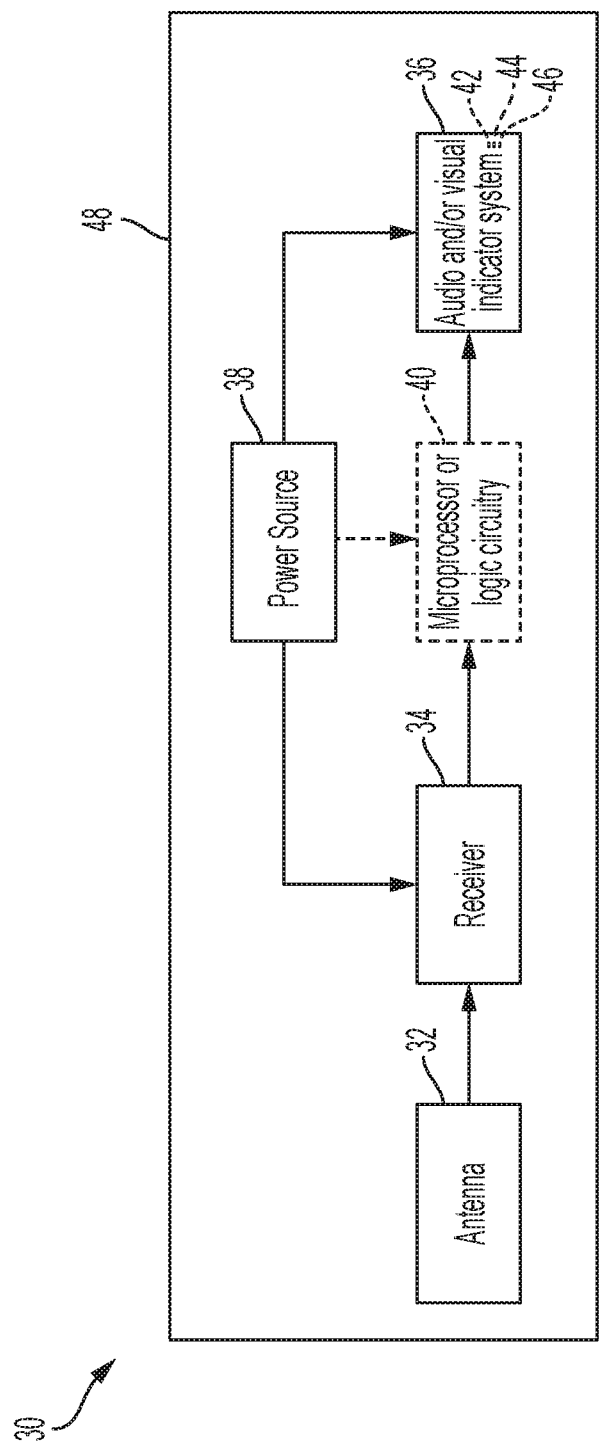
FIG. 2 is a block diagram showing components of a receiving portion or device according to an embodiment of the present disclosure.

Referring to FIGS. 1-2, the loading dock signal light change indicator system or apparatus may be comprised of a transmitting portion or device 10 (as shown in FIG. 1) and a receiving portion or device 30 (as shown in FIG. 2). Although shown in FIGS. 1-2 as separate devices or portions, both devices (or portions) may be combined into a single device in some examples of the loading dock signal light change indicator apparatus.

Transmitting device 10 may be retrofitted to an existing trailer axle distance indicator system, such as shown in U.S. Pat. No. 8,421,611, the complete disclosure of which is hereby incorporated by reference for all purposes. Alternatively, transmitting device 10 may be installed or attached as a stand-alone unit. In the example shown in FIG. 1, transmitting device 10 includes a light sensor 12, a transmitter 14, and antenna 16, and a power source 18.

Light sensor 12 includes any sensor that can detect a change in a loading dock signal light assembly and generate one or more detection signals based on, or in response to, that detected change. For example, the light sensor can detect a change in which light of the loading dock signal light assembly is illuminated, such as a change from illumination of only a first signal light to illumination of only a second signal light with each light having a different color, or a change from a red signal light to a green signal light. In some examples, the light sensor detects the change by a change of position of the light emitted from the loading dock signal light assembly. For example, the light sensor can detect that light was previously emitted from only a first signal light and that now light is being emitted from only a second signal light spaced from the first signal light, such as below or to the right of the first signal light. In other examples, the light sensor can detect a change in color of the light emitted from the loading dock signal light assembly, such as a change in color from red to green light regardless of the location of which portion of the loading dock signal light assembly the light is being emitted from. In further examples, the light sensor can detect both a change of location of the light being emitted and a change a color of the light being emitted from the loading dock signal light assembly. Although a single light sensor 12 is shown in FIG. 1, the transmitting device can include two or more light sensors.

Transmitter 14 receives the detection signal(s) from light sensor 12 and transmits one or more signals to receiving device 30 based on, or in response to, the detection signal(s). The signals are transmitted may be the same as the detection signal(s) or may be different signal(s) based on the type of transmission performed by the transmitter. For example, transmitter 15 may be a radio transmitter so that the signals are wirelessly transmitted, such as via antenna 16, to receiving device 30. The radio transmitter can transmit the wireless signals using any suitable protocol, such as WiFi, Bluetooth, cellular, digital radio, or analog radio. In other examples, the transmission may be via a wired connection to the receiving device. In those examples, antenna 16 may be excluded from transmitting device 10.

Power source 18 provides power to one or more other components of the transmitting device, such as light sensor 12, transmitter 14, and/or a microprocessor (when included in the transmitting device). For example, power source 18 may include one or more of battery(ies), solar panel(s), fuel cell(s), and/or connections to on-board and/or offboard AC or DC power source.

In some examples, transmitting device 10 includes a microprocessor or logic circuitry 20 that receives the detection signal(s) from the light sensor and generates one or more control signals to the transmitter, which is transmitted by the transmitter. In some examples, transmitting device includes a housing 22 to contain one or more other components of the transmitting device. Although other components of transmitting device 10 is shown to be contained within housing 22, other examples of transmitting device may have one or more components located outside housing 22, such as antenna 14 and/or other component(s).

In the example shown in FIG. 2, receiving device 30 includes an antenna 32, a receiver 34, an audio/visual indicator system or audio/visual device 36, and a power source 38. Antenna 32 and receiver 34 receive signals transmitted from the antenna of the transmitting device and sends those signals to audio/visual device 36 (or a microprocessor when included in the receiving device)

Audio/visual device 36 provide or generate audio, visual, vibratory, and/or tactile outputs based on, or in response to, the signals received by receiver 34 from the transmitting device. For example, audio/visual device 36 may include one or more visual signaling devices 42, such as one or more lights, light emitting diodes, etc. The visual signaling devices may illuminate and stay on ("steady state") or may flash or strobe in response to the received signals. The audio/visual device may additionally, or alternatively, include auditory signaling devices 44, such as one or more speakers, buzzer, and/or alarms. In some examples, audio/visual device 35 may include vibratory or tactile signaling devices 46, such as via one or more eccentrically mounted electric motors in the housing of the receiving device. The vibratory signaling devices may be in addition to, or instead of, the visual and/or auditory signaling devices.

Power source 38 provides power to one or more other components of the receiving device, such as receiver 34, audio/visual device 36, and/or a microprocessor (when included in the receiving device). For example, power source 38 may include one or more of battery(ies), solar panel(s), fuel cell(s), and/or connections to on-board and/or offboard AC or DC power source. In some examples where the transmitting and receiving devices are connected via one or more wired connections, then there may be a single power source for both devices.

In some examples, receiving device 30 includes a microprocessor or logic circuitry 40 that receives the transmitted signal(s) from receiver 34 and generates one or more control signals to audio/visual device 36. In some examples, receiving device 30 includes a housing 48 to contain one or more other components of the receiving device. Although other components of receiving device 10 is shown to be contained within housing 48, other examples of transmitting device may have one or more components located outside housing 48, such as antenna 32 and/or other component(s).

Figure 3:
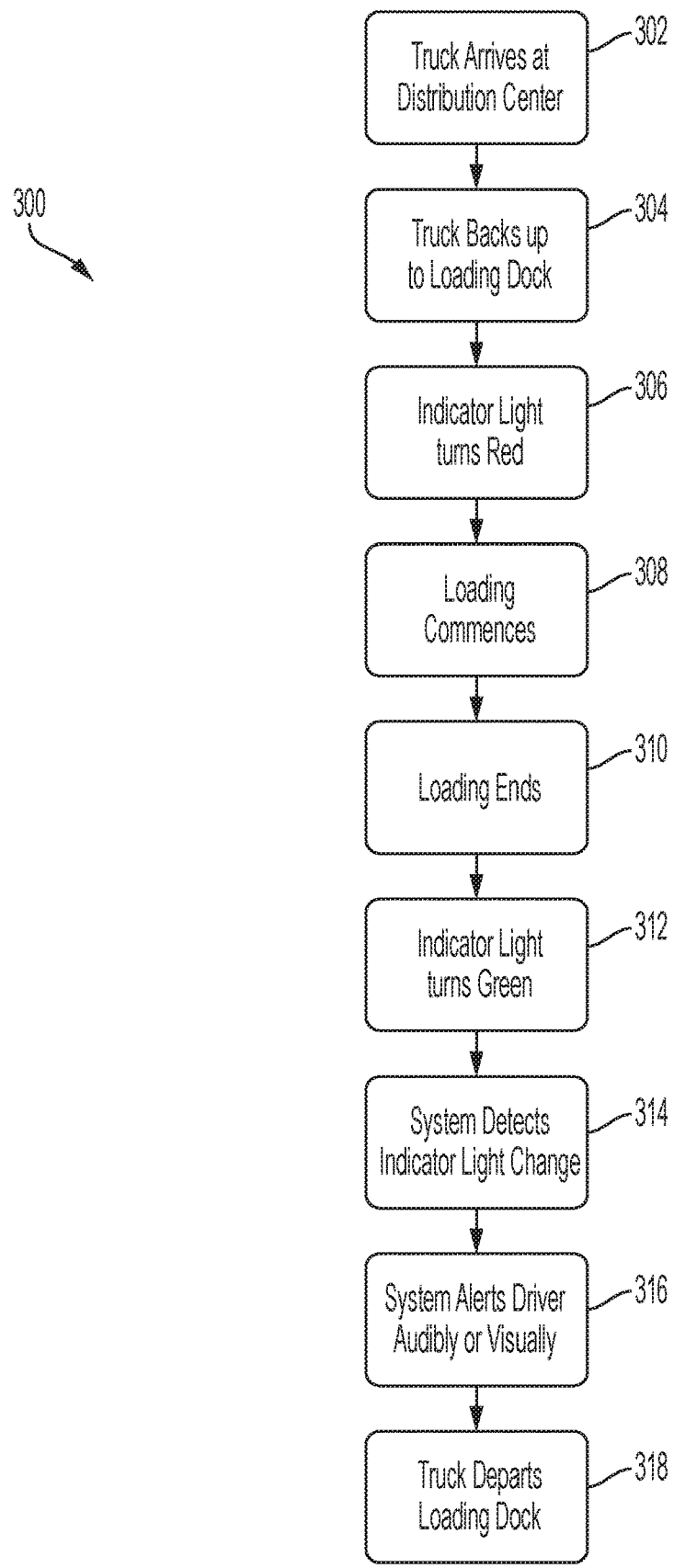
FIG. 3 is a flowchart of the loading process for a truck using a loading dock signal light change indicator apparatus according to an embodiment of the present disclosure.

Referring to FIG. 3, a method of alerting a driver in a cab of a truck is generally indicated at 300. At 302, a truck arrives at a distribution or loading/unloading center. At 304, the driver of the truck backs up to a loading dock (or loading bay) equipped with a signal light assembly or red/green dock indicator light system. The signal light assembly may include a housing having a plurality of signal lights of different colors, such as red and green. At 306, the red signal light of the signal light assembly is illuminated. At 308, loading (or unloading) commences. At 310, loading (or unloading) ends.

At 312, the red signal light of the signal light assembly ceases to be illuminated and the green signal light of the signal light assembly is illuminated. At 314, the change of illumination from the signal light assembly is detected. For example, a light sensor (e.g., located or positioned outside the cab of the truck) of the above loading dock signal light change indicator apparatus detects the change from illumination of only the red signal light to illumination of only the green signal light, and/or a change of color of the light emitted from the signal light assembly.

At 316, one or more audio, visual, vibratory, and/or tactile outputs are generated (e.g., inside the cab of the truck) to alert the driver of the truck of the detected change. For example, an audio/visual device of the above loading dock signal light change indicator apparatus may generate the above output(s) based on the detected change, such as a speaker producing an audible notification, a strobe light flashing, and/or a buzzer buzzing. At 318, the truck departs the loading dock.

Some benefits of the above disclosure include an increase in efficiency for loading and unloading tractor trailers. This translates into more trucks being processed by distribution or loading/unloading center per day, additional freight that can be moved in a given time period, reduced time driver spends at the center, and/or increased profits for the drivers of the tractor trailers. Other benefits may be realized as examples of the present disclosure are implemented throughout the transportation industry.

Although the disclosed loading dock signal light change indicator apparatus and methods have been shown and described with reference to the foregoing operational principles and preferred embodiments, it will be apparent to those skilled in the art that various changes in form and detail may be made without departing from the spirit and scope of the disclosure. The present disclosure is intended to embrace all such alternatives, modifications and variances that fall within the scope of the appended claims.

Numbered paragraphs that further define the loading dock signal light change indicator apparatus and methods of the present disclosure are provided below.

A1. A loading dock signal light change indicator apparatus, comprising:
a light sensor that detects a change in which signal light of a loading dock signal light assembly is illuminated, and that generates one or more detection signals in response to that detected change;
a transmitter that transmits one or more signals in response to the one or more detection signals;
a receiver that receives the one or more transmitted signals from the transmitter; and
an audio/visual device that generates at least one of an audio output or a visual output in response to the receiver receiving the one or more transmitted signals, wherein the audio/visual device is separate and distinct from the loading dock signal light assembly.

A2. The apparatus of paragraph A1, where the loading dock signal light assembly includes first and second signal lights each having a different color, wherein the light sensor detects a change from illumination of the first signal light to illumination of the second signal light.

A3. The apparatus of paragraph A2, where the first signal light is a red signal light and the second signal light is a green signal light, and wherein the light sensor detects a change from illumination of the red signal light to illumination of the green signal light.

A4. The apparatus of any of paragraphs A1-A3, wherein the light sensor detects a change in color from light emitted from the loading dock signal light assembly.

A5. The apparatus of any of paragraphs A1-A4, wherein the light sensor detects a change in color from a red color to a green color of light emitted from the loading dock signal light assembly.

A6. The apparatus of any of paragraphs A1-A5, wherein the light sensor and the transmitter are in electrical communication via one or more wired connections.

A7. The apparatus of paragraph A6, wherein the receiver and the audio/visual device are in electrical communication via one or more wired connections.

A8. The apparatus of paragraph A7, wherein the transmitter and receiver are in wireless communication with each other.

A9. The apparatus of paragraph A7, wherein the transmitter and receiver are in wired communication with each other.

A10. The apparatus of any of paragraphs A1-A9, wherein the audio/visual device includes a speaker.

A11. The apparatus of any of paragraphs A1-A10, wherein the audio/visual device includes one or more lights.

A12. The apparatus of any of paragraphs A1-A11, wherein the audio/visual device includes an electric motor to produce one or more vibrations.

A13. The apparatus of any of paragraphs A1-13, further comprising a first microprocessor that receives the one or more detection signals from the light sensor and generates one or more first control signals to the transmitter.

A14. The apparatus of paragraph A13, wherein the transmitter sends the one or more transmitted signals in response to the one or more first control signals from the first microprocessor.

A15. The apparatus of any of paragraphs A1-A14, further comprising a second microprocessor that receives the one or more transmitted signals from the receiver and generates one or more second control signals to the audio/visual device.

A16. The apparatus of paragraph A15, wherein the audio/visual device generates the one or more audio/visual outputs in response to the one or more second control signals from the second microprocessor.

B1. A loading dock signal light change indicator apparatus, comprising:
a light sensor that detects a change from illumination of a red signal light to illumination of a green signal light from a loading dock signal light assembly, and that generates one or more detection signals in response to that detected change;
a transmitter that transmits one or more wireless signals in response to the one or more light sensor signals;
a receiver that receives the one or more wireless signals from the transmitter; and
an audio/visual device that generates one or more audio or visual outputs in response to the receiver receiving the one or more wireless signals, wherein the audio/visual device is separate and distinct from the loading dock signal light assembly.

B2. The apparatus of paragraph B1, wherein the audio/visual device generates one or more audio and visual outputs in response to the receiver receiving the one or more wireless signals.

B3. The apparatus of paragraph B2, wherein the audio/visual device generates one or more vibratory outputs in response to the receiver receiving the one or more wireless signals.

C1. A method of alerting a driver in a cab of a truck parked in a loading dock, comprising:
detecting, via a light sensor located outside the cab, a change in which signal light of a loading dock signal light assembly at a loading dock is illuminated; and
generating, via an audio/visual device located in the cab, at least one of audio or visual output indicating the detected change.

C2. The method of paragraph C1, where the loading dock signal light assembly includes first and second signal lights each having a different color, wherein detecting, via a light sensor located outside the cab, a change in which signal light of a loading dock signal light assembly at a loading dock is illuminated includes detecting, via the light sensor located outside the cab, a change from illumination of the first signal light to illumination of the second signal light.

C3. The method of paragraph C2, where first signal light is a red signal light and the second signal light is a green signal light, and wherein detecting, via the light sensor located outside the cab, a change from illumination of the first signal light to illumination of the second signal light includes detecting, via the light sensor located outside the cab, a change from illumination of the red signal light to illumination of the green signal light.

C4. The method of any of paragraphs C1-C3, wherein detecting, via a light sensor located outside the cab, a change of illumination from a loading dock signal light assembly at the loading dock includes detecting, via the light sensor located outside the cab, a change in color from light emitted from the loading dock signal light assembly.

C5. The method of paragraph C4, wherein detecting, via the light sensor located outside the cab, a change in color from light emitted from the loading dock signal light assembly includes detecting, via the light sensor located outside the cab, a change in color from red to green of the light emitted from the loading dock signal light assembly.

C6. The method of any of paragraphs C1-05, further comprising transmitting, via a transmitter outside the cab, one or more signals in response to the detected change.

C7. The method of paragraph C6, further comprising receiving, via a receiver in the cab, the one or more transmitted signals.

C8. The method of paragraph C7, wherein generating, via an audio/visual device located in the cab, at least one of audio or visual output indicating the detected change includes generating the at least one of audio or visual output indicating the detected change in response to the one or more transmitted signals.

C9. The method of any of paragraphs C1-C8, wherein generating, via an audio/visual device located in the cab, at least one of audio or visual output indicating the detected change includes generating, via the audio/visual device located in the cab, one or more audio outputs.

C10. The method of any of paragraphs C1-C9, wherein generating, via an audio/visual device located in the cab, at least one of audio or visual output indicating the detected change includes generating, via the audio/visual device located in the cab, one or more visual outputs.

C11. The method of any of paragraphs C1-C10, further comprising generating, via the audio/visual device located in the cab, one or more vibratory outputs.

D1. A method of alerting a driver in a cab of a truck parked in a loading dock, comprising:
detecting, via a light sensor outside the cab, a change from illumination of a red signal light to illumination of a green signal light from a loading dock signal light assembly at the loading dock;
transmitting, via a transmitter outside the cab, one or more signals in response to the detected change;
receiving, via a receiver in the cab, the one or more transmitted signals; and
generating, via an audio/visual device in the cab, audio and visual outputs indicating the detected change in response to the one or more transmitted signals.

D2. The method of paragraph D1, further comprising generating, via the audio/visual device located in the cab, one or more vibratory outputs in response to the one or more transmitted signals.

The specific embodiments disclosed and illustrated herein are not to be considered in a limiting sense as numerous variations are possible. The subject matter of the present disclosure includes all novel and non-obvious combinations and subcombinations of the various elements, features, functions and/or properties of the embodiments disclosed herein. Similarly, where the claims recite "a" or "a first" element or the equivalent thereof, such claims should be understood to include incorporation of one or more such elements, neither requiring nor excluding two or more such elements.

Various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the present disclosure.

What is claimed is:

1. A loading dock signal light change indicator apparatus, comprising:
   a light sensor that detects a change from illumination of a red signal light to illumination of a green signal light of a loading dock signal light assembly, and that generates one or more detection signals in response to that detected change;
   a transmitter that transmits one or more wireless signals in response to the one or more light sensor signals;
   a receiver that receives the one or more wireless signals from the transmitter; and
   an audio and light display that generates one or more audio or visual outputs in response to the receiver receiving the one or more wireless signals, wherein the audio and light display is separate and distinct from the loading dock signal light assembly.

2. The apparatus of claim 1, wherein the audio and light display includes one or more light emitting diodes or one or more lights.

3. The apparatus of claim 2 wherein the one or more lights or one or more light emitting diodes flash repeatedly.

4. The apparatus of claim 1, wherein the audio and light display generates one or more vibratory outputs in response to the receiver receiving the one or more wireless signals.

5. The apparatus of claim 1 wherein the audio and light display includes a motor mounted in the receiver, and said motor vibrates the receiving device in response to the receiver receiving the one or more wireless signals from the transmitter.

6. The apparatus of claim 1 wherein the audio and light display further comprises an on-off control, wherein the audio and light display continues generating audio or visual outputs until the on-off control is activated.

7. The apparatus of claim 1 wherein the transmitter intermittently and periodically transmits wireless signals to the receiver in response to the one or more light sensor signals.

8. A method of alerting a driver in a cab of a truck parked in a loading dock, comprising:
   detecting, via a light sensor outside the cab, a change from illumination of a red signal light to illumination of a green signal light from a loading dock signal light assembly at the loading dock;
   transmitting, via a transmitter outside the cab, one or more signals in response to the detected change;
   receiving, via a receiver in the cab, the one or more transmitted signals; and
   generating, via an audio and light display in the cab, audio and visual outputs indicating the detected change in response to the one or more transmitted signals.

9. The method of claim 8, further comprising generating, via the audio and light display located in the cab, one or more vibratory outputs in response to the one or more transmitted signals.

10. The method of claim 8, further comprising terminating the generation of audio and visual outputs when the truck is moved away from the loading dock.

11. A loading dock signal light change indicator apparatus, comprising:
   a light sensor that detects a change from illumination of a red signal light to illumination of a green signal light of a loading dock signal light assembly, and that generates one or more detection signals in response to that detected change;
   a transmitter that transmits one or more wireless signals in response to the one or more light sensor signals;
   a receiver that receives the one or more wireless signals from the transmitter; and
   a visual device that generates one or more visual outputs in response to the receiver receiving the one or more wireless signals, wherein the visual device is separate and distinct from the loading dock signal light assembly, and wherein the visual device includes only one or more light emitting diodes or only one or more lights.

12. The apparatus of claim 11, further comprising an audio device that generates one or more audio outputs in response to the receiver receiving the one or more wireless signals, wherein the audio device is separate and distinct from the loading dock signal light assembly, and wherein the audio device includes only a speaker and only one of a buzzer or an alarm that generates the one or more audio outputs via the speaker.

13. The apparatus of claim 12, further comprising a vibratory signaling device that generates one or more vibratory outputs via only an electric motor in response to the receiver receiving the one or more wireless signals, wherein the vibratory signaling device is separate and distinct from the loading dock signal light assembly.

* * * * *